United States Patent [19]

Tsai

[11] Patent Number: 5,719,404
[45] Date of Patent: Feb. 17, 1998

[54] METHOD AND APPARATUS FOR CALIBRATING THE HORIZONTAL STARTING POINT OF A DOCUMENT ON A FLATBED SCANNER

[75] Inventor: Jenn-Tsair Tsai, Yang-Mei, Taiwan

[73] Assignee: Must Systems, Inc., Taiwan

[21] Appl. No.: 637,048

[22] Filed: Apr. 24, 1996

[51] Int. Cl.$^6$ .................................................. G01N 21/86
[52] U.S. Cl. .................... 250/559.29; 250/559.1; 250/234; 358/488
[58] Field of Search ................... 250/559.29, 559.3, 250/234–236, 559.1; 358/488, 474, 497, 449

[56] References Cited

U.S. PATENT DOCUMENTS

| | | | |
|---|---|---|---|
| 4,957,689 | 9/1990 | Ohnishi et al. | 358/476 |
| 5,097,350 | 3/1992 | Baran | 358/476 |
| 5,479,274 | 12/1995 | Baba | 250/559.01 |

FOREIGN PATENT DOCUMENTS 147499  6/1979  Taiwan .

*Primary Examiner*—Que Le

[57] ABSTRACT

A method and apparatus is used on a flatbed scanner for calibrating the horizontal starting point of a document which is to be scanned by the flatbed scanner. The flatbed scanner is of the type having a light-sensing device as a CCD or CIS device consisting of a linear array of light-sensing cells and a movable scan head. In the method and apparatus, two reflective marks are fixed at a predetermined calibrating position to the front edge of the document. During the calibration process, the movable scan head is moved to the calibrating position where it senses the two reflective marks to thereby determine the distance in pixels between the first light-sensing cell on the linear array and the first reflective mark, and also the distance in pixel between the two reflective marks. The distance in pixel between the first reflective mark and the horizontal starting point of the document can then be determined. After that, the distance in pixels between the first light-sensing cell on the linear array and the horizontal starting point of the document is determined to thereby determine which light-sensing cell on the linear array is to be used as the starting light-sensing cell corresponding to the horizontal starting point of the document. The movable scan head is then further moved to the front edge of the document where the scan process over the document is started.

2 Claims, 3 Drawing Sheets

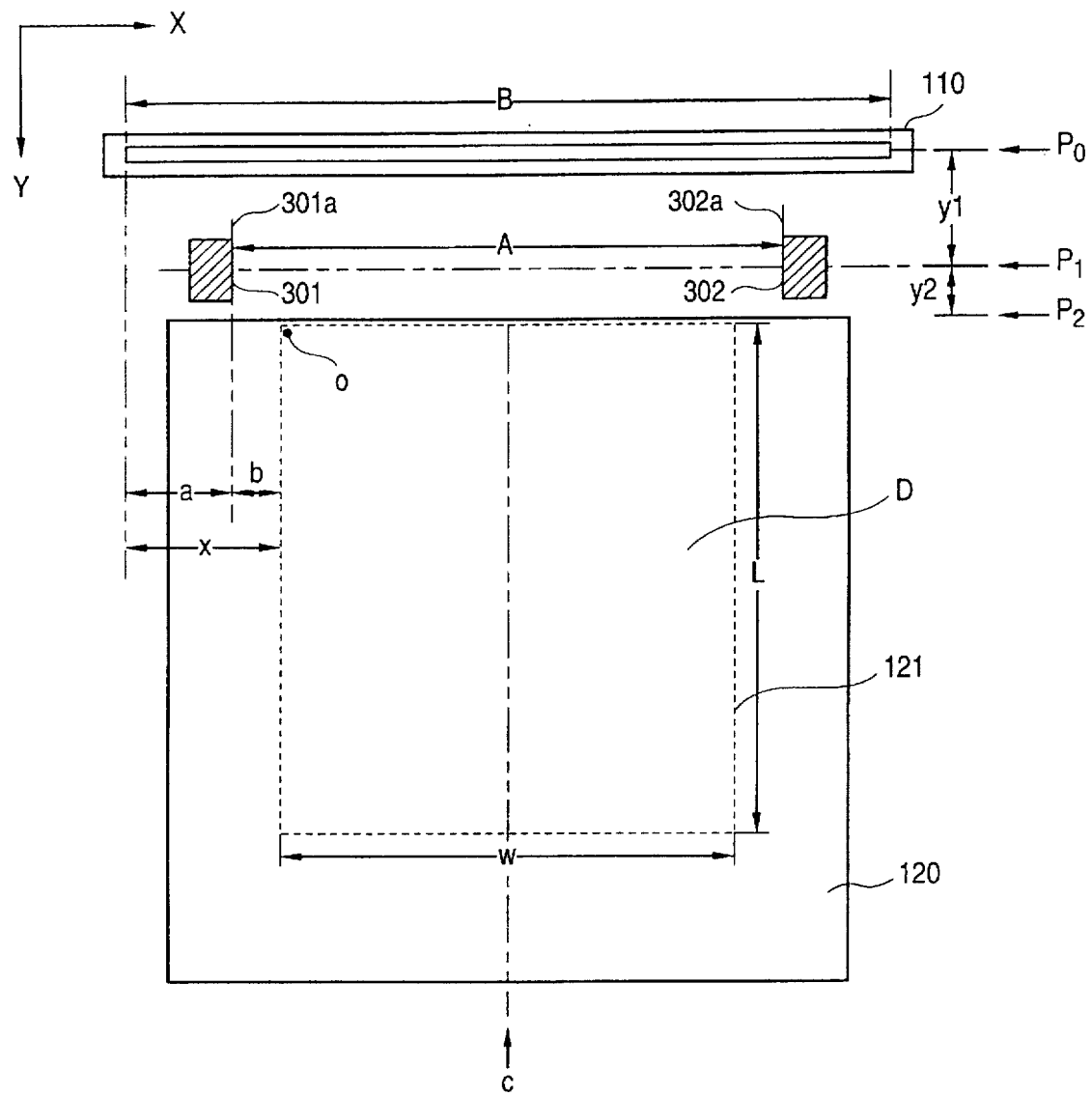

METHOD AND APPARATUS FOR CALIBRATING THE HORIZONTAL STARTING POINT OF A DOCUMENT ON A FLATBED SCANNER

BACKGROUND OF THE INVENTION

1. Field of the Invention

The present invention relates to flatbed scanners, and more particularly, to a method and apparatus used on a flatbed scanner for calibrating the horizontal starting point of a document that is to be scanned by the flatbed scanner.

2. Description of Related Art

A flatbed scanner is an opto-electric device capable of converting the printed data on a document into digital form for processing by the computer. The document that is to be scanned is fixedly placed on a transparent glass plate on the flatbed scanner and a movable scan head moves over the document and to make a scan that converts the printed data on the document into digital form. The scan head is optically coupled to a linear array of light-sensing cells as CCD or CIS cells, each cell corresponding to a pixel in the scanned image.

The transparent glass plate is rectangular-shaped with a size larger than the document that is to be scanned. Reference marks are provided on the transparent glass plate that allow the user to place the document at correct positions. To allow the scan to cover the entire document, the scan should start at the upper/leftmost point of the document. This point is referred to as "reference point" or "horizontal starting point" (hereinafter in this specification, the term "horizontal starting point" will be used) which corresponds to the pixel (0,0) in the scanned image. Before the scan can be started, the scanner should find where the horizontal starting point of the document is located.

In ROC Patent No. 147,499 to Hewlett Packard Inc. of USA, a method capable of locating the horizontal starting point is disclosed. This method, however, needs to adjust the positioning of the scan head both in X-direction and Y-direction, which is a quite time-consuming process to locate the horizontal starting point. There exists therefore a need for a method that can locate the horizontal starting point by adjusting the positioning of the scan head only in one direction so that the calibration process can be more quickly achieved.

SUMMARY OF THE INVENTION

It is therefore a primary objective of the present invention to provide on a flatbed scanner a method and apparatus capable of locating the horizontal starting point of the document that is to be scanned by adjusting the positioning of the scan head only in one direction so that the calibration process can be more quickly achieved.

In accordance with the foregoing and other objectives of the present invention, a new and improved calibrating method and apparatus is provided. In the method and apparatus according to the present invention, at least a first reflective mark and a second reflective mark are placed at a calibrating position between the front edge of the document and the home position. The calibrating position is located at a first distance from the home position and a second distance from the front edge of the document. During the calibration process, the movable scan head is moved first by the first distance to the calibrating position where the movable scan head optically detects the two reflective marks to thereby determine the total number of pixels between the first light-sensing cell on the linear array and the pixel corresponding to the inner edge of the first reflective mark, and also the total number of pixels between the pixel corresponding to the inner edge of the first reflective mark and the pixel corresponding to the inner edge of the second reflective mark. Subsequently, the total number of pixels between the inner edge of the first reflective mark and the horizontal starting point of the document is determined. In accordance with the data thus acquired, the total number of pixels between the first light-sensing cell on the linear array and the horizontal starting point of the document is determined to thereby determine which light-sensing cell on the linear array is to be used as the starting light-sensing cell corresponding to the pixel of the horizontal starting point of the document. After that, the movable scan head is moved by the second distance to the front edge of the document where the scan process is started to make a scan over the document.

BRIEF DESCRIPTION OF DRAWINGS

The present invention can be more fully understood by reading the subsequent detailed description of the preferred embodiments thereof with references made to the accompanying drawings, wherein:

FIG. 2 is a schematic diagram of the top view of the flatbed scanner of FIGS. 1A–1C.

DETAILED DESCRIPTION OF PREFERRED EMBODIMENT

Figure 1A:
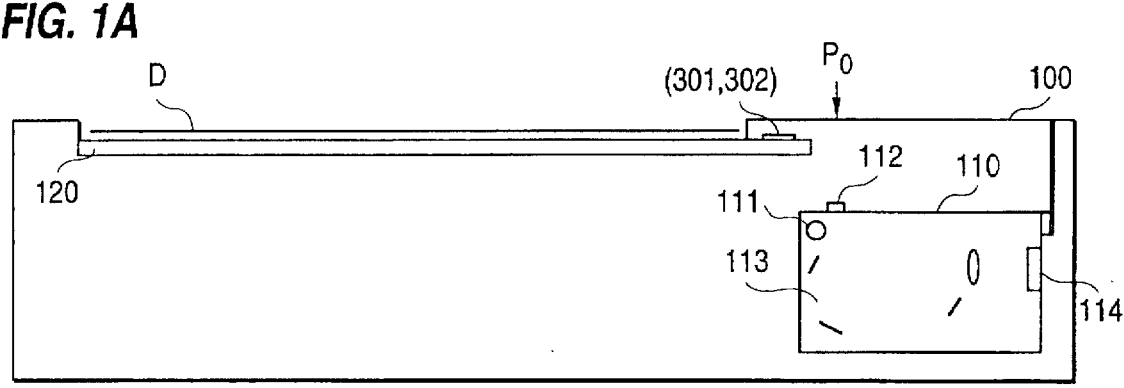
FIGS. 1A–1C are schematic diagrams of a flatbed scanner employing the calibrating method and apparatus according to the present invention, showing three stages in the calibrating procedure.
Figure 1B:
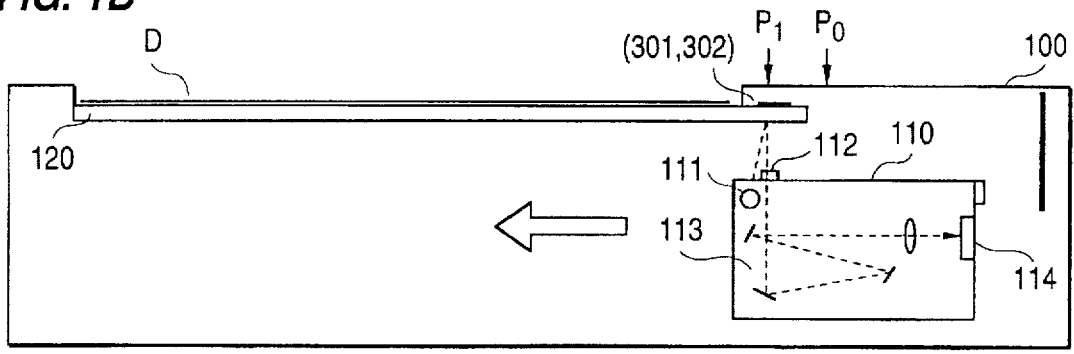
Figure 1C:
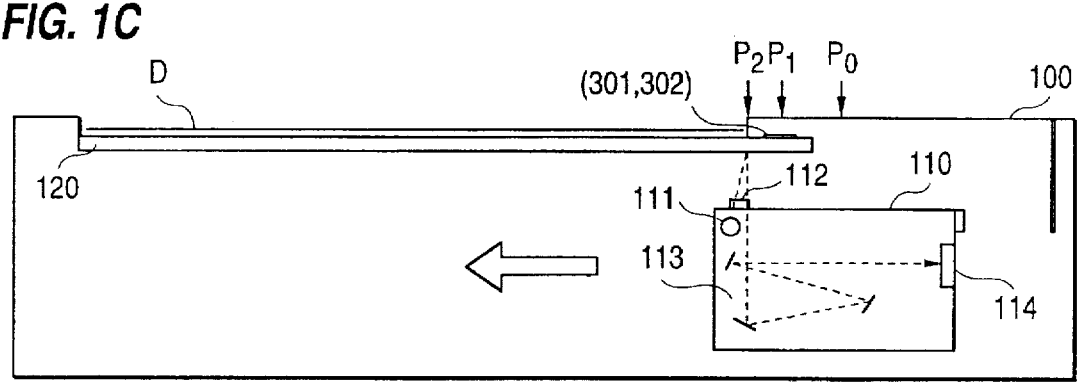

FIGS. 1A–1C show schematic diagrams of a flatbed scanner 100 employing the calibrating method and apparatus according to the present invention. As shown in FIG. 1A, the flatbed scanner 100 has its scanning mechanism substantially identical to conventional ones, including a movable light-sensing device 110 and a transparent glass plate 120 on which a document D that is to be scanned by the flatbed scanner 100 is placed. The movable light-sensing device 110 consists of a light source 111 for generating a white light beam to illuminate the document D, a scan head 112 for receiving reflected light from the light source, an optical system 113 for guiding the light, and a linear array of light-sensing cells 114 for generating opto-electrical signals representative of the RGB components of the detected light. When not in use, the movable light-sensing device 110 has its scan head 112 positioned at a home position $P_0$. The flatbed scanner 100 shown here is of the type having the whole of its light-sensing device movable; however, other types of flatbed scanners that include a fixed array of light-sensing cells and a movable scan head optically coupled to the light-sensing cells are also applicable. Also, the light-sensing cells can be either CCD cells or CIS cells.

Each light-sensing cell (not individually shown) on the linear array 114 corresponds to a pixel (picture element) of the scanned image of the document. The number of light-sensing cells per unit length on the linear array represents the resolution of the scanner. Customarily, the resolution is represented by "dpi" (dots per inch). A flatbed scanner normally provides the resolution of 300, 600, or 1,200 dpi. Higher resolutions are also available on high-end scanners. All the elements and the combination thereof in the movable light-sensing device 110 are conventional techniques so that description thereof will not be further detailed.

Referring also to FIG. 2, the present invention is characterized in that a pair of reflective marks, a first reflective mark 301 on the left and a second reflective mark 302 on the right, are attached on the calibration paper to the front end of the transparent glass plate 120, with the horizontal center line aligned with a calibrating position as indicated by the numeral $P_1$. The calibrating position $P_1$ is located at a distance of $y_1$ away from the home position $P_0$ of the movable light-sensing device 110 and a distance of $y_2$ away from the front edge (indicated by the numeral $P_2$) of the transparent glass plate 120. The color of the two reflective marks 301, 302 is comparatively dark so as to provide sharp contrast with respect to the environment surrounding the two reflective marks 301, 302. The sharp contrast would allow the movable light-sensing device 110 to easier detect the edge of the reflective marks 301, 302. The values of $y_1$ and $y_2$ are predetermined in advance and stored in a displacement controller (not shown) that controls the displacement and movement of the movable light-sensing device 110 during the scan.

The transparent glass plate 120 is used to place a document D that is to be scanned by the scanner thereon. The document D placed on the transparent glass plate 120 is to be aligned precisely by the scanner user with a rectangular box as indicated by the dotted box 121 which is dimensioned to just fit in a particular size of document, for instance, the letter size 8.5"×11". It is an important note to the scanner user that the document D be placed with its front edge precisely aligned with the front edge of the dotted box 121. In practice, the front edge of the dotted box is usually aligned with the front edge of the transparent glass plate 120 for easy placement of the document D. In FIG. 2, the size of the document D is indicated by W×L, where W is the width of the document and L is the length of the same. The vertical center line of the document D is indicated by a broken line labeled with the numeral C. The maximum horizontal range that the movable light-sensing device 110 is able to scan is indicated by the length B.

Before moving the movable light-sensing device 110 over the document D to make a scan, the scanner is required to perform a calibration process so as to find the horizontal starting point of the document D which is indicated by a dot labeled with the numeral O in FIG. 2. The horizontal starting point O corresponds to the pixel located at origin (0,0) in the scanned image. The procedural steps involved in the calibration process is shown in the flow diagram of FIG. 3.

Figure 3:
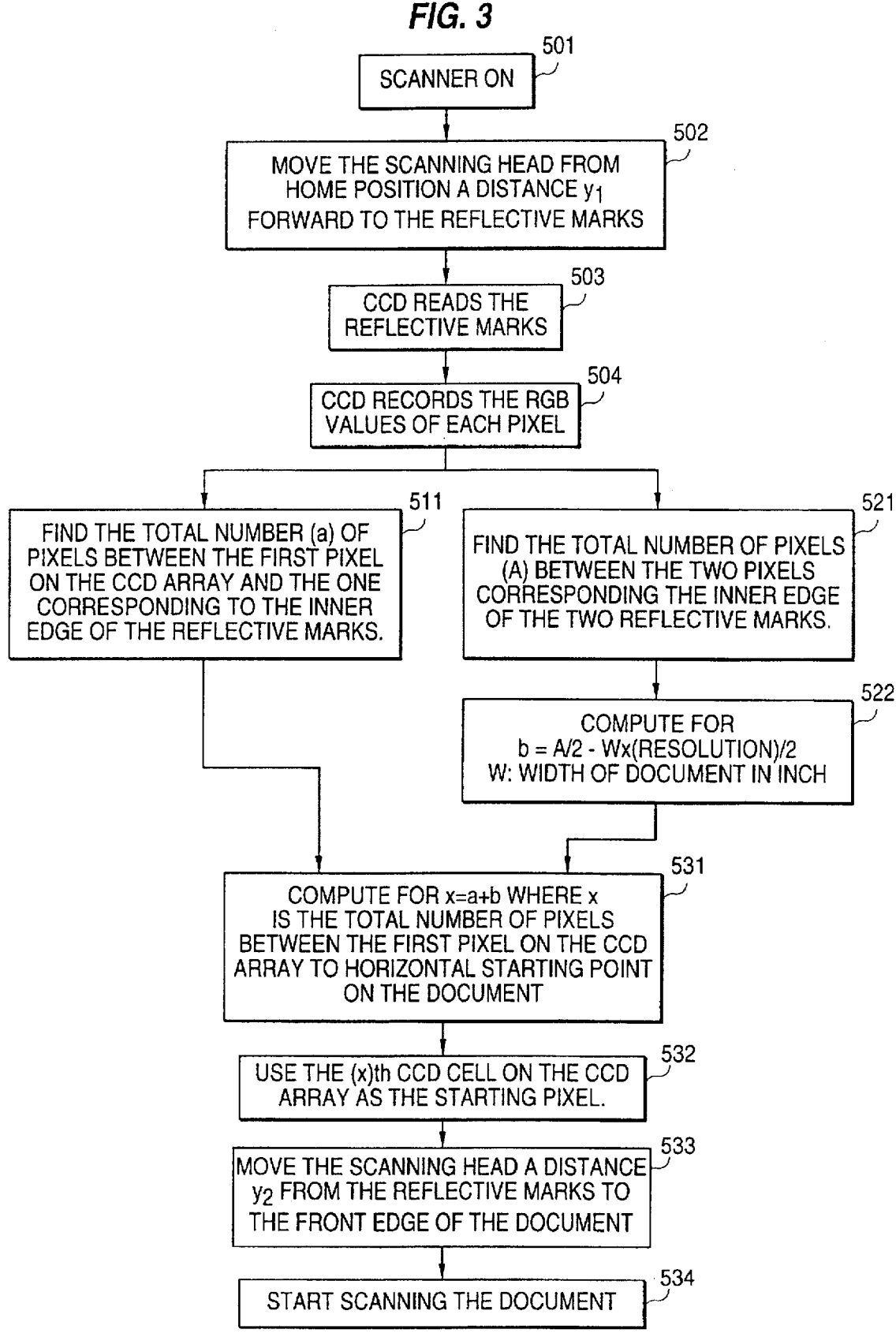
FIG. 3 is a flow diagram showing the procedural steps carried by the calibrating method and apparatus according to the present invention.

Referring to FIG. 3, the calibration process starts at step 501 in which the scanner is turned on. At step 502, the movable light-sensing device 110 is moved from the home position $P_0$ by the built-in distance of $y_1$ to the calibrating position $P_1$ where the reflective marks 301, 302 are located, as illustrated in FIG. 2B.

Subsequently at steps 503 and 504, the movable light-sensing device 110 sends out a light beam from the light source 111 and the reflected light from the reflective marks 301, 302 is received by the scan head 112 and transferred by the optical system 113 to the linear array 114. The RGB components of the reflected light are thus recorded by the linear array 114 such that the location of the inner edge 301a of the first reflective mark 301 and that of the inner edge 302a of the second reflective mark 302 can be determined; in other words, the particular light-sensing cell that detects the inner edge 301a of the first reflective mark 301 and the particular light-sensing cell that detects the inner edge 302a of the second reflective mark 302 can be determined.

Subsequently at step 511, the total number of pixels (or light-sensing cells) between the first light-sensing cell on the linear array 114 and the one that detects the inner edge 301a of the first reflective mark 301 is determined. Assume the total number is a. Meanwhile, at step 521, the total number of pixels between the light-sensing cell that detects the inner edge 301a of the first reflective mark 301 and the light-sensing cell that detects the inner edge 302a of the second reflective mark 302 is determined. Assume the total number is A. Next, at step 522, the total number of pixels within the horizontal range from the inner edge 301a of the first reflective mark 301 to the horizontal starting point O, assuming b, is determined in accordance with the following equation:

$$b=A/2-W*(Resolution)/2$$

where A is the total number of pixels within the horizontal range between the two reflective marks 301, 302, W is the width of the document in inch, and (Resolution) is the resolution of the scanner in dpi.

With the values of a and b being determined, the total number of pixels within the horizontal range between the first light-sensing cell on the linear array 114 and the horizontal starting point O of the document D, assuming x, can be determined at step 531 in accordance with the following equation:

$$x=a+b$$

At step 532, the (x)th light-sensing cell on the linear array 114 is assigned as the starting light-sensing cell that is to be used to scan the horizontal starting point O of the document D.

Taken the letter size of 8.5"×11" and resolution of 600 dpi as example, if the calibration process determines that A=5, 200 pixels and a=20 pixels, then $$b=5,200/2-8.5*600/2=50 \text{ pixels}$$

Therefore, $$x=20+50=70$$

Accordingly, the 70th light-sensing cell on the linear array 114 corresponds to the first vertical line of pixels of the scanned image.

Subsequently at step 533, the movable light-sensing device 110 is moved from the calibrating position $P_1$ by the built-in distance of $y_2$ to the front edge $P_2$ of the transparent glass plate 120. Then, the movable light-sensing device 110 is moved forward over the document D and starts scanning the document D from the (x)th light-sensing cell on the linear array 114.

The present invention has been described hitherto with exemplary preferred embodiments. However, it is to be understood that the scope of the present invention need not be limited to the disclosed preferred embodiments. On the contrary, it is intended to cover various modifications and similar arrangements within the scope defined in the following appended claims. The scope of the claims should be accorded the broadest interpretation so as to encompass all such modifications and similar arrangements.

What is claimed is:

1. A method used on a flatbed scanner for calibrating the horizontal starting point of a document that is to be scanned by the flatbed scanner, the flatbed scanner being of the type having a light-sensing device including a linear array of light-sensing cells and a moveable scan head optically coupled to the light-sensing cells, the movable scan head being positioned at a home position when not in use, said method comprising the steps of:

(1) placing at least a first reflective mark and a second reflective mark at a calibrating position between the front edge of the document and the home position, the calibrating position being located at a first distance from the home position and a second distance from the front edge of the document;

(2) moving the movable scan head by the first distance to the calibrating position;

(3) allowing the movable scan head to sense the two reflective marks to thereby determine the total number of pixels between the first light-sensing cell on the linear array and the pixel corresponding to the inner edge of the first reflective mark, and also the total number of pixels between the pixel corresponding to the inner edge of the first reflective mark and the pixel corresponding to the inner edge of the second reflective mark;

(4) determining the total number of pixels between the inner edge of the first reflective mark and the horizontal starting point of the document;

(5) determining the total number of pixels between the first light-sensing cell on the linear array and the horizontal starting point of the document to thereby determine which light-sensing cell on the linear array is to be used as the starting light-sensing cell corresponding to the pixel of the horizontal starting point of the document;

(6) moving the movable scan head by the second distance to the front edge of the document; and (7) starting a scan over the document.

2. An apparatus used on a flatbed scanner for calibrating the horizontal starting point of a document that is to be scanned by the flatbed scanner, the flatbed scanner being of the type having a light-sensing device including a linear array of light-sensing cells and a movable scan head, the movable scan head being positioned at a home position when not in use, said apparatus comprising:

at least a first reflective mark and a second reflective mark placed at a calibrating position between the front edge of the document and the home position, the calibrating position being located at a first distance from the home position and a second distance from the front edge of the document;

said apparatus performing a calibration process comprising the steps of:

moving the movable scan head by the first distance to the calibrating position;

allowing the movable scan head to sense the two reflective marks to thereby determining the total number of pixels between the first light-sensing cell on the linear array and the pixel corresponding to the inner edge of the first reflective mark, and also the total number of pixels between the pixel corresponding to the inner edge of the first reflective mark and the pixel corresponding to the inner edge of the second reflective mark;

determining the total number of pixels between the inner edge of the first reflective mark and the horizontal starting point of the document;

determining the total number of pixels between the first light-sensing cell on the linear array and the horizontal starting point of the document to thereby determine which light-sensing cell on the linear array is to be used as the starting light-sensing cell corresponding to the pixel of the horizontal starting point of the document;

moving the movable scan head by the second distance to the front edge of the document; and starting a scan over the document.

* * * * *